(No Model.)
R. STEEL.
WHEELED VEHICLE.
No. 504,685.  Patented Sept. 5, 1893.
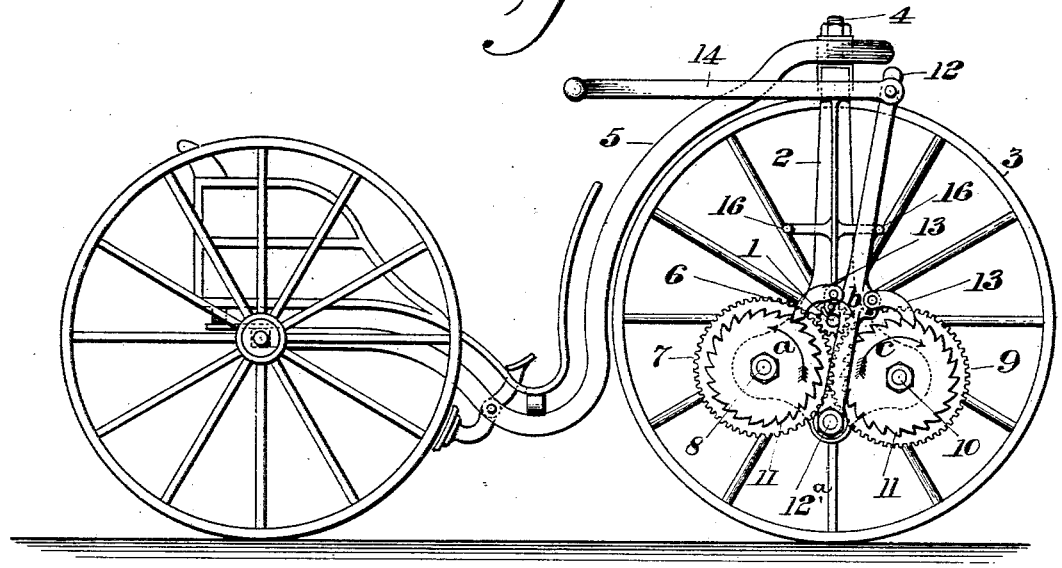
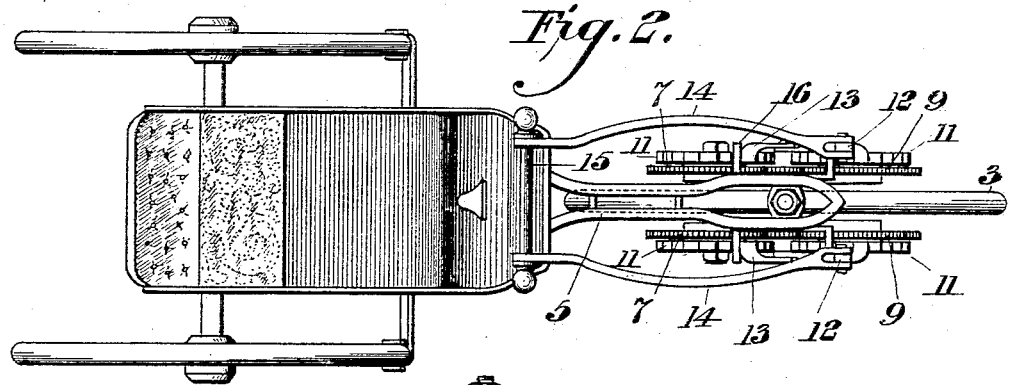
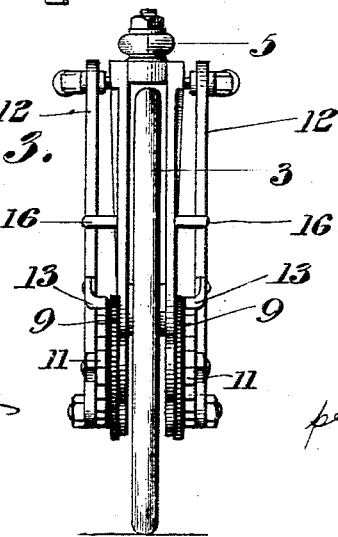
Witnesses:
E. M. Williams
John M. Ward
Inventor:
Robert Steel,
per John R. Nolan
Attorney

United States Patent Office.

ROBERT STEEL, OF PHILADELPHIA, PENNSYLVANIA, ASSIGNOR TO WILLIAM J. MOORE, OF SAME PLACE.

WHEELED VEHICLE.

SPECIFICATION forming part of Letters Patent No. 504,685, dated September 5, 1893.

Application filed September 9, 1892. Serial No. 445,413. (No model.)

*To all whom it may concern:*

Be it known that I, ROBERT STEEL, a citizen of the United States, residing in the city and county of Philadelphia and State of Pennsylvania, have invented certain new and useful Improvements in Wheeled Vehicles, of which the following is a full, clear, and exact description, reference being had to the accompanying drawings, forming a part of this specification.

This invention relates to a mechanism of novel construction for converting a reciprocating movement into a continuous rotary movement; the same being applied to cycles and other vehicles as a means of propulsion therefor.

The invention consists in various novel features of construction and operation which will be hereinafter set forth in detail.

In the drawings,—Figure 1 is a side elevation of a tricycle in which my invention is embodied. Fig. 2 is a plan. Fig. 3 is an end view of the front wheel and its connections.

The numeral 1 represents a shaft, and 2 a suitable frame in which it is supported. This shaft may be the axle of a wheel, as, for instance, the front wheel 3 of a tricycle. In that case the frame constitutes a yoke which is pivotally connected at its upper end, by means of a pintle 4, with the forward extension of the reach or "back-bone," 5, of the vehicle. The ends of the shaft extend beyond the sides of the frame 2, and have each secured thereto a pinion 6. In gear with each pinion is a spur wheel 7, which is mounted on a lower stud 8 that projects from an arm on the side of the frame; and in gear with this spur wheel is a similar spur wheel 9 which is mounted on a corresponding stud 10. On the face of each of these spur wheels is a ratchet wheel 11, the teeth of one ratchet wheel being inclined in one direction and those of the other in an opposite direction, as shown. The ratchet and gear wheels on both sides of the machine correspond in construction and relative arrangement.

Fulcrumed on a stud 12ª near the bottom of each member of the frame 2 is the lower end of a vertical arm 12 on which are pivoted at proper points two pawls 13 that engage the teeth of the ratchet wheels respectively, whereby when the arm is vibrated to and fro the opposed ratchet wheels are alternately moved. In the drawings, the arm 12 is represented as thrown forward. When it is drawn back the rear pawl thereon will act upon the teeth of the opposed ratchet wheel and move the latter in the direction of the adjacent arrow (*a*); thereby correspondingly impelling the approximate spur wheel, and perforce rotating the co-acting pinion in a reverse direction, to wit, that indicated by the arrow *b*. When the arm is again thrown forward, the front pawl will act against the teeth of the opposed ratchet wheel and thus move the latter and its spur wheel in the direction of the arrow *c*, thereby rotating the engaged spur wheel and the pinion in the direction indicated by the arrows *a* and *b* respectively. Hence, a continuous rotary movement will be imparted to the shaft during both strokes of the arm.

When the mechanism is applied to the front wheel of a tricycle, as illustrated, the arms 12 are connected by a handle frame, whereby said arms may be not only reciprocated but guided and controlled by any occupant of the vehicle. This frame comprises two laterally bent bars 14 that are pivotally connected at their forward ends with the arms 12, and are united at their opposite ends by a cross-bar 15. It will be obvious that when the frame is reciprocated the arms and perforce the pawl and ratchet mechanism will be operated as above described; and also that when the frame is turned toward either side the wheel and its connections will be correspondingly moved to effect the steering of the vehicle.

Fixed to the respective sides of the supporting frame 2, are outwardly projecting studs, 16, which constitute determinate stops for the arms in their reciprocative movements.

By means of the duplex ratchet and pawl mechanism above described the reciprocating motion of the handle frame is converted into a continuous rotary motion without the necessity of overcoming dead points or centers. The advantage of this in a road conveyance subject to jolts and jars is obvious; for whatever be the conditions, so long as sufficient power is applied to the reciprocating handle frame, the ratchet wheels and their connections will be revolved.

If desired the handle frame, as I have termed it, may be connected with, and actuated by, the piston rod of a steam engine or other motor.

I claim—

1. In a wheeled vehicle, the combination with the pivoted frame, of the pinion on the shaft or axle of the wheel in said frame, the ratchet wheels, and the spur wheels mounted on said frame, the vibrating arm, the pawls thereon engaging the teeth of the ratchet wheels respectively, and the handle bar or frame connected with said vibratory arm, and adapted to be used for operating and steering the vehicle substantially as described.

2. In a wheeled vehicle, the combination with the pivoted frame, of the pinions on the ends of the shaft or axle of the wheel in said frame, the ratchet wheels and the spur wheels mounted on the respective sides of said frame, the vibratory arms, the pivoted pawls thereon engaging the teeth of the ratchet wheels respectively, and the handle frame pivotally connected with said vibratory arms, and adapted to be used for operating and steering the vehicle substantially as described.

In testimony whereof I have hereunto affixed my signature in the presence of two subscribing witnesses.

ROBERT STEEL.

Witnesses:
WM. F. BALLINGER,
JOHN R. NOLAN.